E. M. DUFFEY.
BATTERY PLATE SUPPORT.
APPLICATION FILED APR. 12, 1920.
1,353,154.
Patented Sept. 21, 1920.
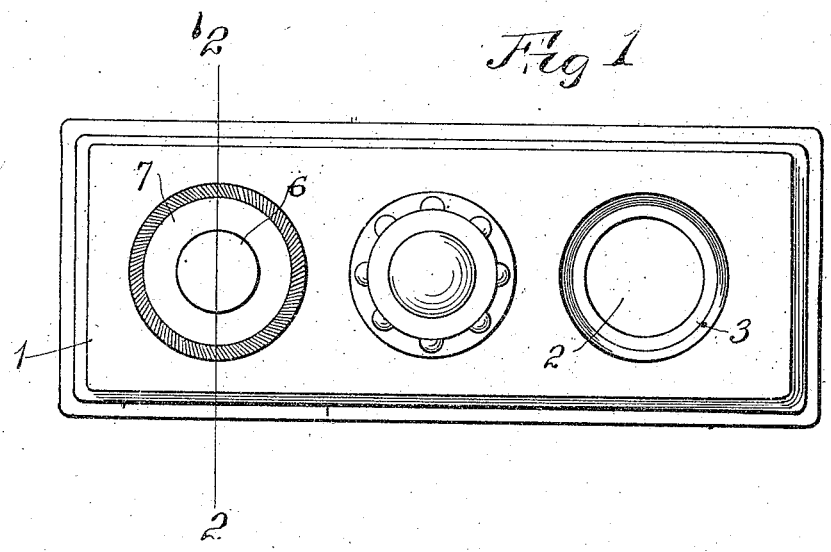
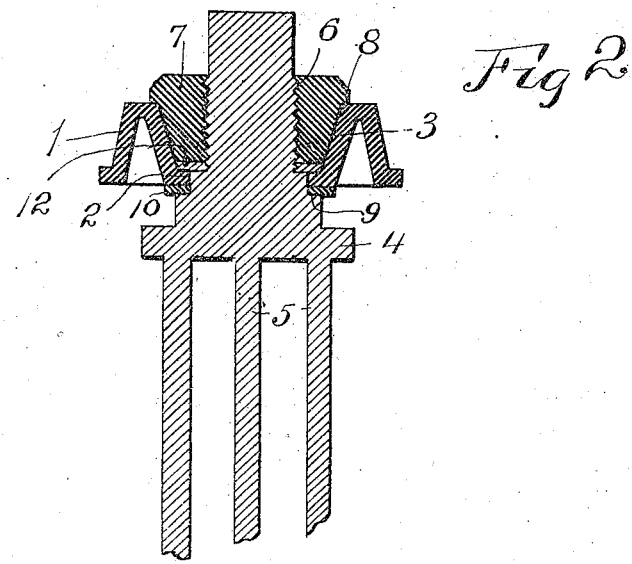
Witness:
R. E. Hamilton
Inventor,
Edward M. Duffey
By Warren D. House
His Attorney.

UNITED STATES PATENT OFFICE.

EDWARD M. DUFFEY, OF KANSAS CITY, MISSOURI.

BATTERY-PLATE SUPPORT.

1,353,154.  Specification of Letters Patent.  Patented Sept. 21, 1920.

Application filed April 12, 1920. Serial No. 373,379.

*To all whom it may concern:*

Be it known that I, EDWARD M. DUFFEY, a citizen of the United States, residing at Kansas City, in the county of Jackson and State of Missouri, have invented a certain new and useful Improvement in Battery-Plate Supports, of which the following is a specification.

My invention relates to improvements in battery plate supports.

It is particularly well adapted for application to storage batteries of the type in which the plates are supported by a member which extends through and is supported by the cover of the jar, which contains the plates.

The object of my invention is to provide novel and efficient means for securely attaching the plate supporting member to the cover, and which will hermetically seal the joint between the plate support and the cover.

The novel features of my invention are hereinafter fully described and claimed.

In the accompanying drawing, which illustrates the preferred embodiment of my invention, Figure 1 is a plan view showing a battery jar cover and a plate support provided with my improvement.

Fig. 2 is a vertical section on the line 2—2 of Fig. 1.

Similar reference characters designate similar parts in the different views.

1 designates a battery jar cover of the ordinary type, provided with a vertical hole 2 and a conical recess 3 concentric with said hole.

4 designates a supporting member or plate adapted to support one set of plates 5 of a storage battery, said support 4 having a screw-threaded portion 6 which extends through the hole 2 and through the recess 3 to a point above the top of the cover 1.

Fitted on the threaded extension 6 is a nut, which like the cover 1, is preferably of hard rubber, and which has a conical periphery fitted to the recess 3 and which has an annular shoulder 8 adapted to bear upon the top of the cover 1.

The plate supporting member 4 is provided with an annular shoulder 9 which bears against the under side of the cover 1, an annular gasket 10 of soft rubber being interposed between the shoulder 10 and the under side of the cover 1.

In the operation of my invention, the gasket 10 is slipped over the extension 6 and against the shoulder 9. The extension 6 is then passed through the hole 2 and recess 3, after which sealing material, such as paraffin 12 is poured into the recess 3, following which the nut 7 is screwed onto the extension 6 so as to have its shoulder 8 and its conical periphery bear against the cover 1. The gasket 10 will then be firmly clamped between the shoulder 9 and the cover 1, which, with the presence of the sealing material 12 will prevent leakage through the cover around the extension 6.

The nut 7 effects two other functions, that of holding the plate support tightly clamped against the bottom of the cover 1 and, by reason of the conical periphery of the nut 7 being fitted into the conical portion of the recess 3, the plate support is securely held against lateral shifting and from becoming loose in the cover.

I do not limit my invention to the structure shown and described, as many modifications, within the scope of the appended claims, may be made without departing from the spirit of my invention.

What I claim is:—

1. In a battery plate support of the type having a battery jar cover having a hole therethrough and a conical recess concentric with said hole, and a plate supporting member extending through said hole and recess, and having a threaded portion and a shoulder bearing against the under side of the cover, of a nut fitted on said threaded portion and having a conical periphery fitted in said recess, whereby the plate support is held from vertical and lateral movement in said cover, substantially as set forth.

2. In a battery plate support of the type having a battery jar cover having a hole therethrough and a conical recess concentric with said hole, and having a plate supporting member having a screw-threaded portion extending through said hole and recess, and having a shoulder bearing against the under side of the cover, of a nut fitted on said threaded portion and having a conical periphery fitted in said recess and provided with a shoulder which bears against the top of said cover, substantially as set forth.

3. In a battery plate support of the type having a battery jar cover having a hole therethrough and a conical recess concentric with said hole, and having a plate supporting member having a screw-threaded portion extending through said hole and recess, and having a shoulder bearing against the under side of the cover, of a nut fitted on said threaded portion and having a conical periphery fitted in said recess and provided with a shoulder which bears against the top of said cover, and sealing material interposed between the nut and said cover and plate support.

In testimony whereof I have signed my name to this specification.

EDWARD M. DUFFEY.